(12) United States Patent
Brackett et al.

(10) Patent No.: US 11,745,330 B2
(45) Date of Patent: Sep. 5, 2023

(54) DOOR OPENING DEVICE

(71) Applicants: Johnathan W. Brackett, Gold Hill, OR (US); Tyler Casebeer, White City, OR (US)

(72) Inventors: Johnathan W. Brackett, Gold Hill, OR (US); Tyler Casebeer, White City, OR (US)

( * ) Notice: Subject to any disclaimer, the term of this patent is extended or adjusted under 35 U.S.C. 154(b) by 192 days.

(21) Appl. No.: 17/234,934

(22) Filed: Apr. 20, 2021

(65) Prior Publication Data

US 2021/0323140 A1    Oct. 21, 2021

Related U.S. Application Data

(60) Provisional application No. 63/013,180, filed on Apr. 21, 2020.

(51) Int. Cl.
*B25J 1/02* (2006.01)
*B25J 18/02* (2006.01)
*B25J 15/02* (2006.01)

(52) U.S. Cl.
CPC ............. *B25J 1/02* (2013.01); *B25J 15/0213* (2013.01); *B25J 18/025* (2013.01)

(58) Field of Classification Search
CPC ... B25J 1/02; B25J 1/04; B25J 15/0213; B25J 18/025; B25J 18/04; A47F 13/06
USPC .................................................. 294/209, 210
See application file for complete search history.

(56) References Cited

U.S. PATENT DOCUMENTS

| | | | | |
|---|---|---|---|---|
| 3,414,137 A | * | 12/1968 | Fortin | B25J 1/02 414/7 |
| 4,711,482 A | * | 12/1987 | Brown | B25J 1/04 294/107 |
| 5,348,359 A | * | 9/1994 | Boozer | B25J 1/02 294/24 |
| 5,647,622 A | * | 7/1997 | Schectman | B25J 1/02 294/111 |
| 6,640,667 B1 | * | 11/2003 | Pomerantz | B25B 9/00 81/53.12 |
| 6,739,220 B1 | * | 5/2004 | Johnson | B25B 21/002 81/53.12 |
| 7,677,619 B2 | * | 3/2010 | Hutchings | B25J 1/02 56/333 |
| 10,625,413 B1 | * | 4/2020 | McPherson | B25J 15/0213 |

FOREIGN PATENT DOCUMENTS

GB           2136768 A  *  9/1984  ............... B25J 1/08

* cited by examiner

*Primary Examiner* — Dean J Kramer
(74) *Attorney, Agent, or Firm* — Renner, Otto, Boisselle & Sklar, LLP (57) ABSTRACT

A door opening device comprising a multi-directional head and a telescoping pole is provided. The multi-directional head allows the operator to choose the angle when opening the door and the telescoping pole allows the operator to remain at a distance away from the doorway while operating the doorknob. By allowing an operator to remain around a corner when opening a door, an armed and cornered individual is less able to harm the operator by shooting through the door.

12 Claims, 7 Drawing Sheets

DOOR OPENING DEVICE

RELATED APPLICATIONS

This application claims the benefit of U.S. 63/013,180 filed on Apr. 21, 2020. Which is herein incorporated by reference in its entirety.

TECHNICAL FIELD

The present invention relates to a device for opening doors and, more particularly, to a handheld device for remotely opening a door.

BACKGROUND

A doorway into a room, home, garage, shed, or structure presents a problem for law enforcement. In fact, such doorways are known as the "fatal funnel" in the tactical response world. Not only do doorways act as choke points when entering a room or building, but law enforcement is particularly vulnerable when approaching a door, because they are unable to see what is waiting on the other side. Law enforcement casualties can be reduced by limiting the time that first responders spend in a doorway.

SUMMARY

The present invention enables first responders to safely open a door while remaining outside of the fatal funnel, placing the operator in a tactically advantageous position of their choosing. The present invention provides a door opening device comprising a multi-directional head and a telescoping pole. The multi-directional head allows the operator to choose the angle when opening the door and the telescoping pole allows the operator to remain at a distance away from the doorway while operating the doorknob.

By allowing an operator to remain around a corner when opening a door, an armed and cornered individual is less able to harm the operator by shooting through the door. For example, dangerous individuals will typically attempt to shoot through a door when the doorknob begins turning. Using the invention, it is possible for the operator to remain outside of the path of any bullets being shot through the door while at the same time opening the door. By manipulating the doorknob and opening the door from a safe distance, less time is spent in the "fatal funnel", thereby significantly reducing the opportunity that dangerous individuals have to do harm to first responders.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

Law enforcement typically avoids dynamically entering a building due to the danger presented by the fatal funnel. Instead, slow and deliberate searches, with tools, robots, and cameras are now prevalent. While there are robots available that can open doors, such robots are extremely expensive and are outside of the budget for many smaller law enforcement agencies. The present disclosure provides a low-cost alternative to such robots and allow law enforcement to quickly open doors while remaining outside of the fatal funnel.

According to a general embodiment, a door opening device including a head having a rotatable grabber for grasping and rotating a door handle is provided. The head is located at the end of a telescoping pole opposite a handle. The telescoping pole allows a user operating the handle to remain at a distance from the door handle.

Figure 1:
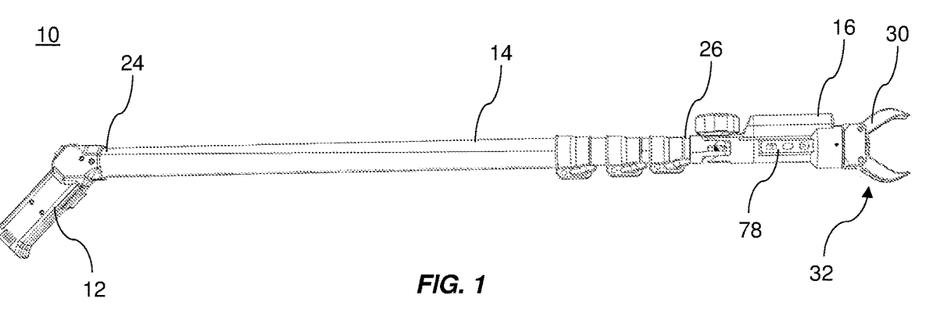
FIG. 1 is a side perspective view an exemplary embodiment of a door opening device.
Figure 2:
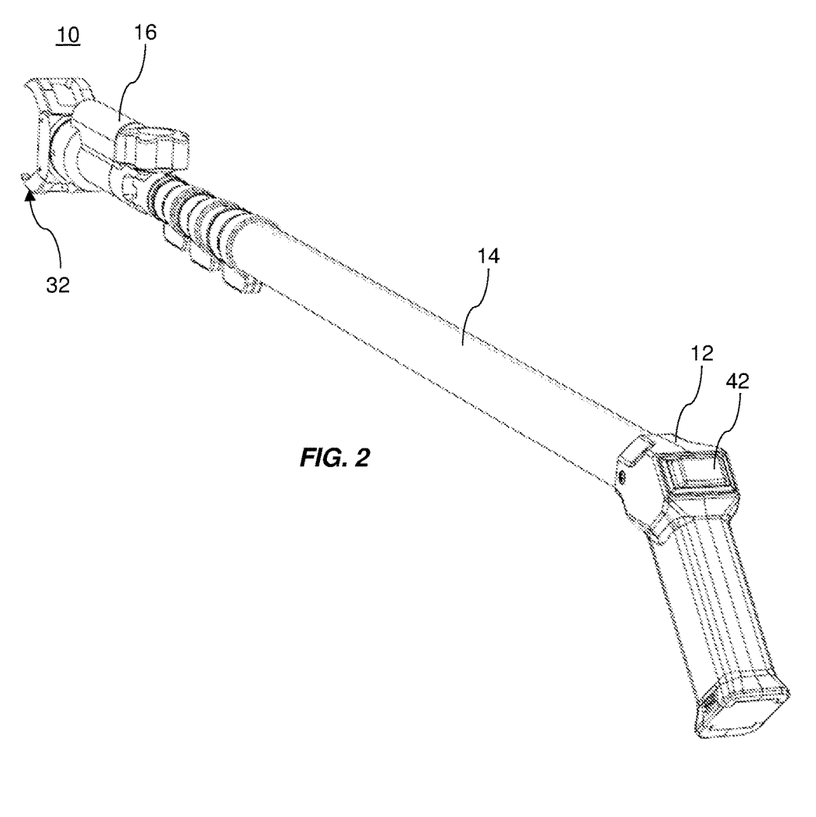
FIG. 2 alterative perspective view of the door opening device of FIG. 1.

In the embodiment shown in FIGS. 1 and 2, a door opening device 10 including a handle 12, a telescoping pole 14, a head 16, a grabber actuator 18, a rotation actuator 20, and a battery 22 is shown. The head 16 includes a grabber 30 that transitions between an open state 32 and a closed state 34. The grabber actuator 18 causes the transition of the grabber 30 between the open state 32 and the closed state 34. Similarly, the rotation actuator 20 rotates the grabber 30. The handle 12 includes a user interface 24 having a grabber element 40 and a rotation element 42. Activation of the grabber element 40 results in transitioning of the grabber 30 between the open state 32 and the closed state 34. Similarly, activation of the rotation element 42 results in rotation of the grabber 30.

The handle 12 is mechanically coupled to a first end 24 of the telescoping pole 14. The head 16 is also mechanically coupled to a second end 26 of the telescoping pole 14 opposite the first end 24. The head 16 may include at least one of the grabber actuator 18 or the rotation actuator 20. For example, in FIG. 3, the head 16 includes both the grabber actuator 18 and the rotation actuator 20. The actuators 18, 20 may comprise electrical or pneumatic actuators. For example, the actuators 18, 20 may be any suitable electrical motor such as a servo motor.

The battery 22 is operatively coupled to the user interface 40, the grabber actuator 18, and the rotation actuator 20. The battery 22 stores electrical power and supplies the electrical power to the grabber actuator 18 and the rotation actuator 20. In the embodiment shown in FIG. 4, the battery 22 is located in the handle 12. In one embodiment, the head 16 and the handle 12 may be electrically coupled, and the grabber actuator 18 and the rotation actuator 20 may be electrical actuators. For example, in the embodiment shown in FIG. 7, the battery 22 is located in the handle 12 and the battery 22 is electrically connected to the gripper actuator 18 and the rotation actuator 20 via an electrical cord 60 traveling between the handle 12 and the head 16 in an interior 62 of the telescoping pole 14. The battery 22 may be any suitable electrical storage device.

Figure 3:
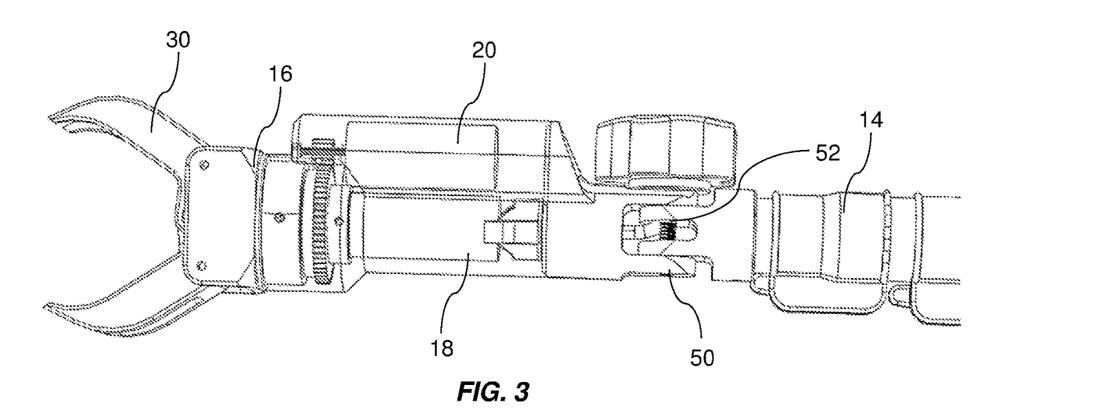
FIG. 3 is a side perspective view of the head of the door opening device of FIG. 1 with a housing of the head made transparent.
Figure 5:
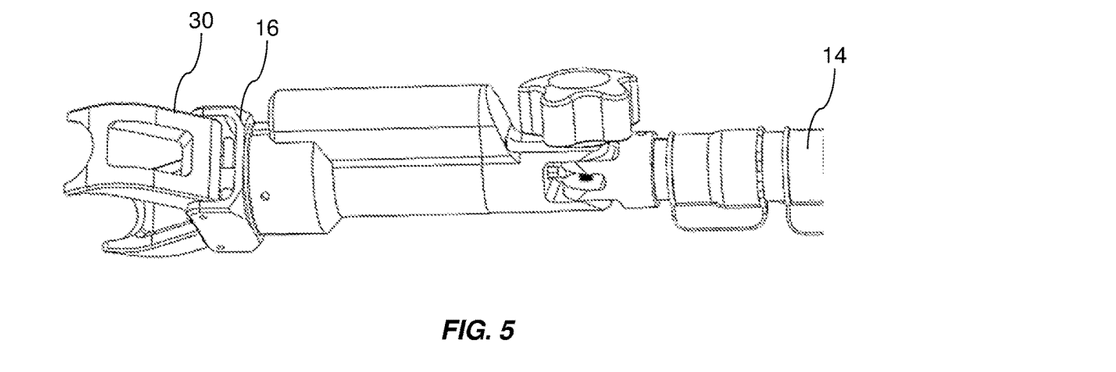
FIG. 5 is a side perspective view of the head of the door opening device of FIG. 1 with a grabber in a rotated position.

As shown in FIGS. 3 and 5, the gripper 16 is rotatable. The rotation of the gripper 16 may be controlled via the rotation actuator 20. In the embodiment shown in FIG. 3, the rotation actuator 20 is a servo motor that turns a gear attached to the rotation actuator 20. This gear in turn rotates a gear that rotates the gripper 30.

Figure 4:
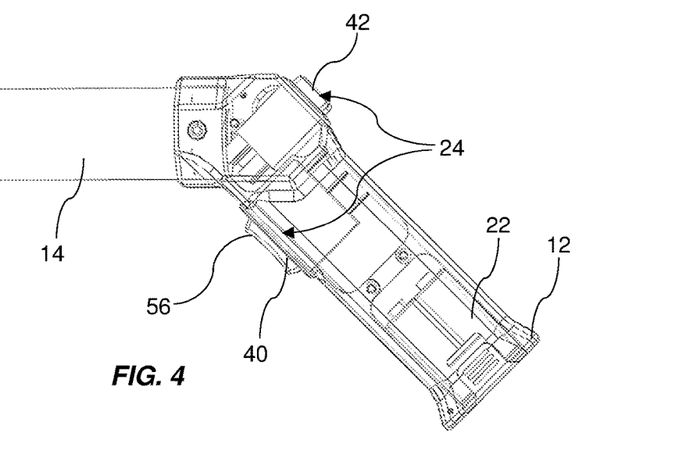
FIG. 4 is a side perspective view of the handle of the door opening device of FIG. 1.

In the embodiment shown in FIG. 4, the gripper element 40 is a button (e.g., a toggle switch) and the rotation element 42 is another button (e.g., a toggle switch) separate from the button of the gripper element 40. As shown, the user interface 24 may be located in the handle 12.

Figure 6:
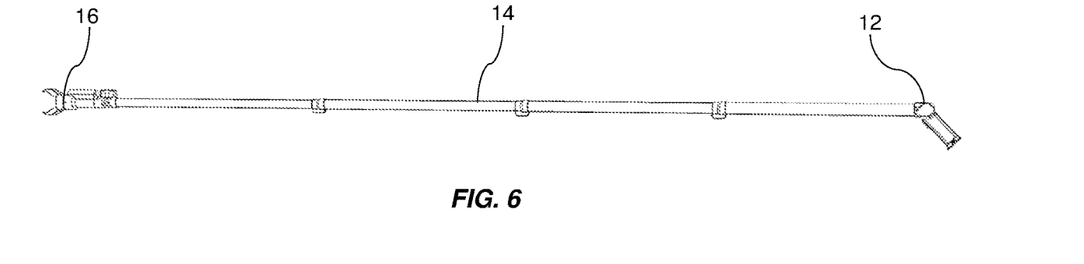
FIG. 6 is a side perspective view of the door opening device of FIG. 1 with a telescoping pole in an extended position.

As shown in the embodiment depicted in FIG. 6, the telescoping pole 14 is extendable. For example, the telescoping pole 14 may include a number of pole sections that are extendable and lockable to vary a length of the telescoping pole 14. By altering the length of the telescoping pole 14, door handles located at various distances from the handle 12 can be operated. The telescoping pole 14 may be extendable such that a length of the door opening device 10 is adjustable between three feet or four feet to ten feet or fourteen feet.

Figure 7:
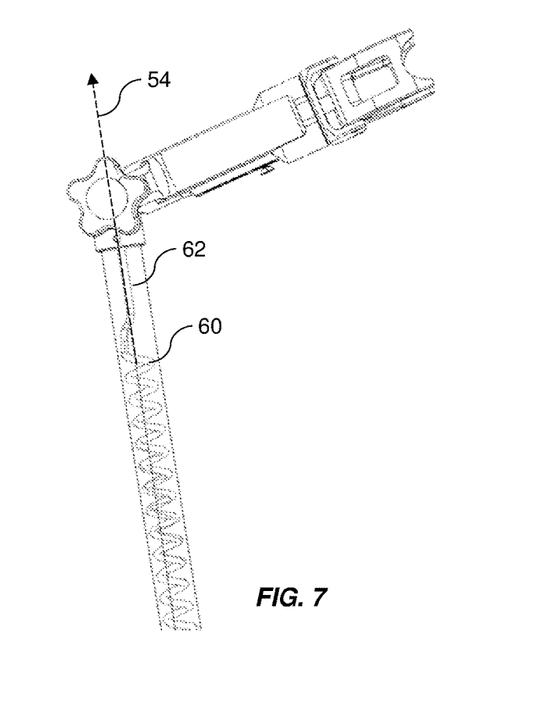
FIG. 7 is a top perspective view of the door opening device of FIG. 1 with an elbow in a rotated position.

In the embodiment shown in FIG. 7, the telescoping pole 14 includes an elbow 50 at the second end 26 and the grabber 30 is mechanically coupled to the elbow 50. The elbow 50 may be adjustable to reposition the grabber 30 off of a central axis 54 of the telescoping pole 14. The elbow 50 may include a set screw for maintaining a position of the head 16 relative to the central axis 54. Alternatively, the door opening device 10 may additionally include an elbow actuator configured to modulate a position of the grabber 30 off of the central axis 54. In this embodiment, the user interface 24 may additionally include an elbow element 56 and activation of the elbow element 56 controls modulation of the position of the grabber 30 off of the central axis 54 by the elbow actuator 52.

Figure 8:
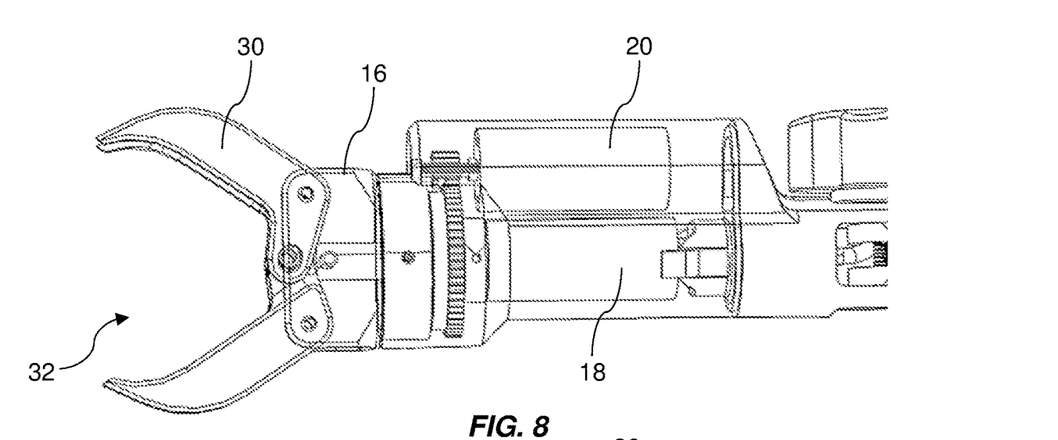
FIG. 8 is a side perspective view of the grabber of FIG. 1 in an open position with a transparent housing.
Figure 9:
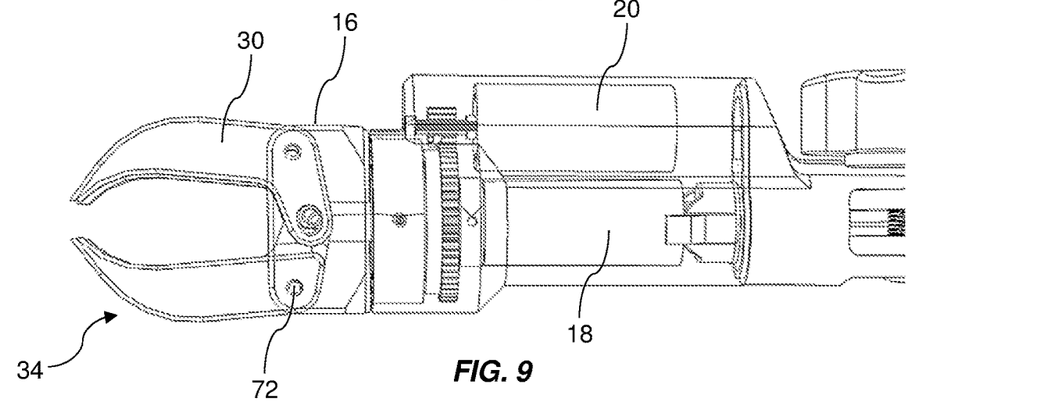
FIG. 9 is a side perspective view of the grabber of FIG. 1 in a closed position with a transparent housing.
Figure 10:
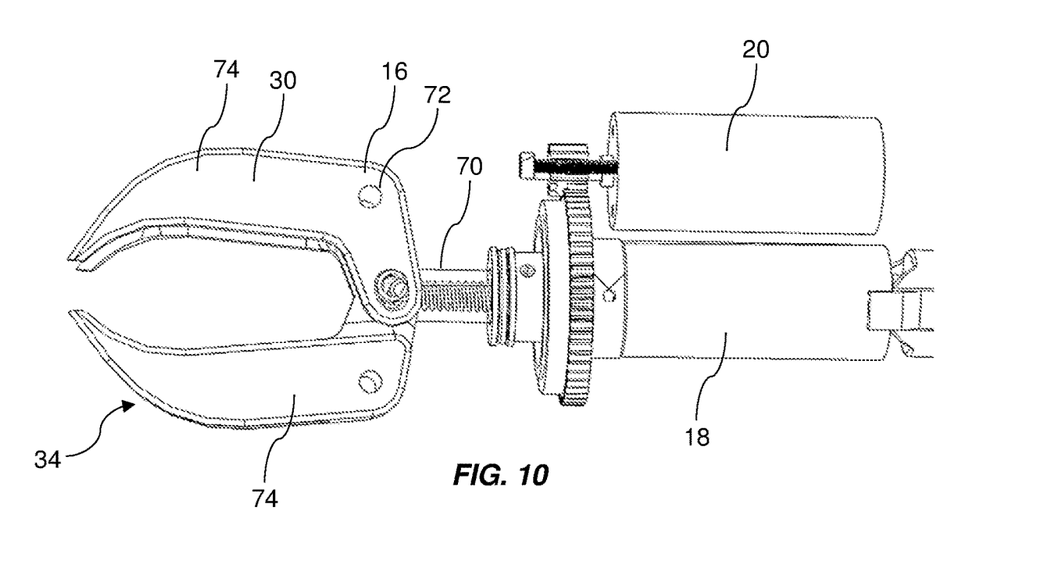
FIG. 10 is a side perspective view of the grabber of FIG. 9 in a closed position with additional transparent elements.

In the embodiments shown in FIGS. 8-10, movement of the gripper 30 between the open 32 and closed 34 position is shown. As described above, the opening and closing of the gripper 30 is controlled by the gripper actuator 18. The gripper actuator 18 may be a servo motor that moves a sleeve 70 towards or away from the gripper 16. The fingers 74 of the gripper 30 may be attached to fixed hinge points 72 and the sleeve 70, such that movement of the sleeve 70 opens and closes the gripper 30.

The head 16 may include a mount 78 for physically attaching accessories to the head. For example, the mount 76 may be a picatinny rail. The accessories may include a light, camera, etc.

In the embodiment depicted in FIGS. 11-15, the door opening device 10 is manually operated without motors and/or batteries. In this embodiment, the handle 12 includes a lever 80. The handle 12 and the head 16 are coupled, such that actuating the lever 80 of the handle 12 results in actuation of the grabber 30 between the open 32 and the closed 34 state. Also, rotating the handle 12 results in a rotation of the grabber 30.

Figures 11, 12:
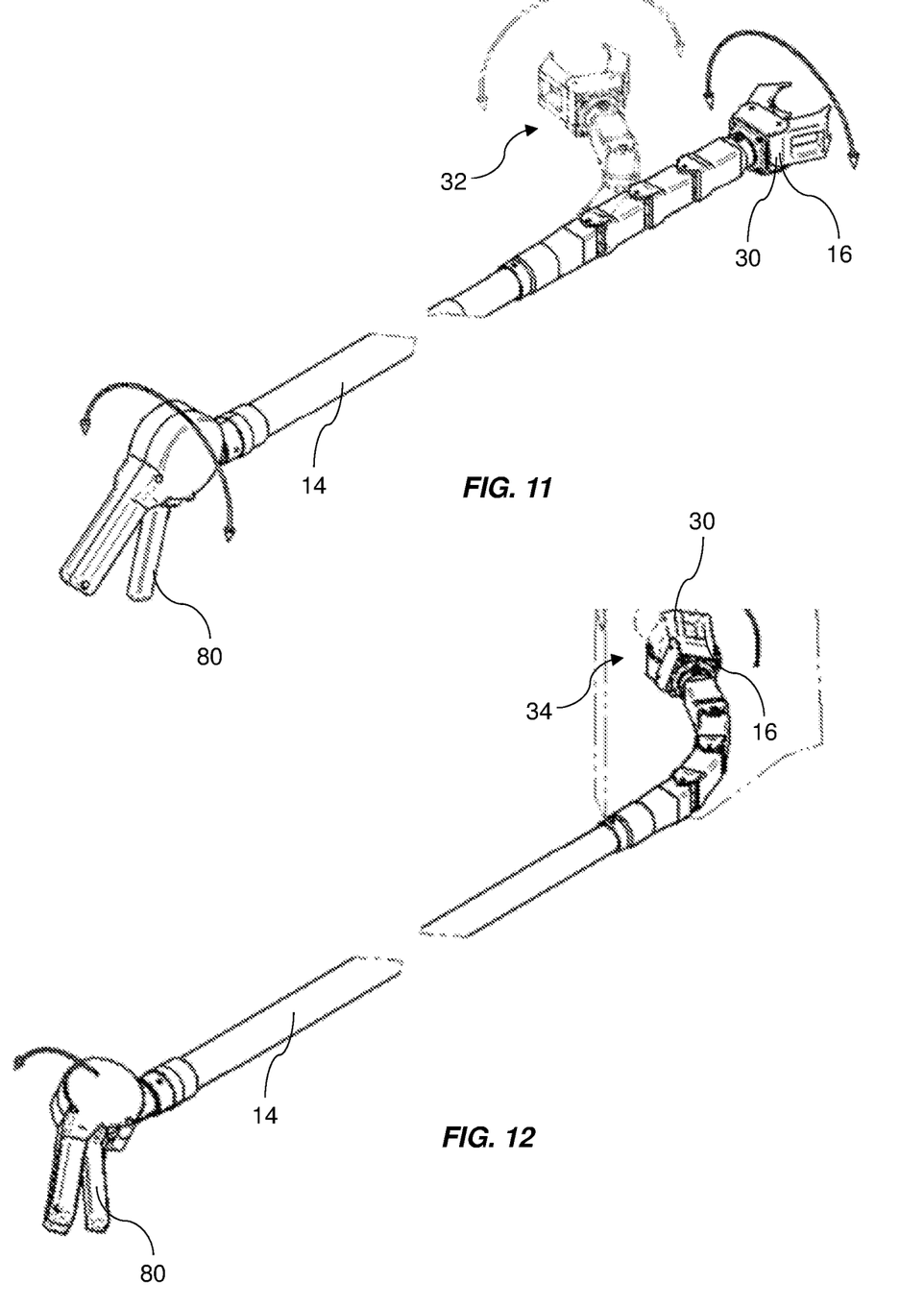
FIG. 11 is a perspective view of an alternative embodiment of the door opening device.
FIG. 12 is a perspective view of the door opening device of FIG. 11 grasping a door handle.

As shown in FIGS. 11 and 12, the elbow may include multiply linked segments that are movable to reposition the grabber 30 off of the central axis 54 of the pole.

In the embodiment shown in FIG. 12, using the device 10 to grasp a door handle is shown. The operator has positioned the device 10 and has grasped the door handle with the head 16 by closing the grasping lever 80.

Figure 13:
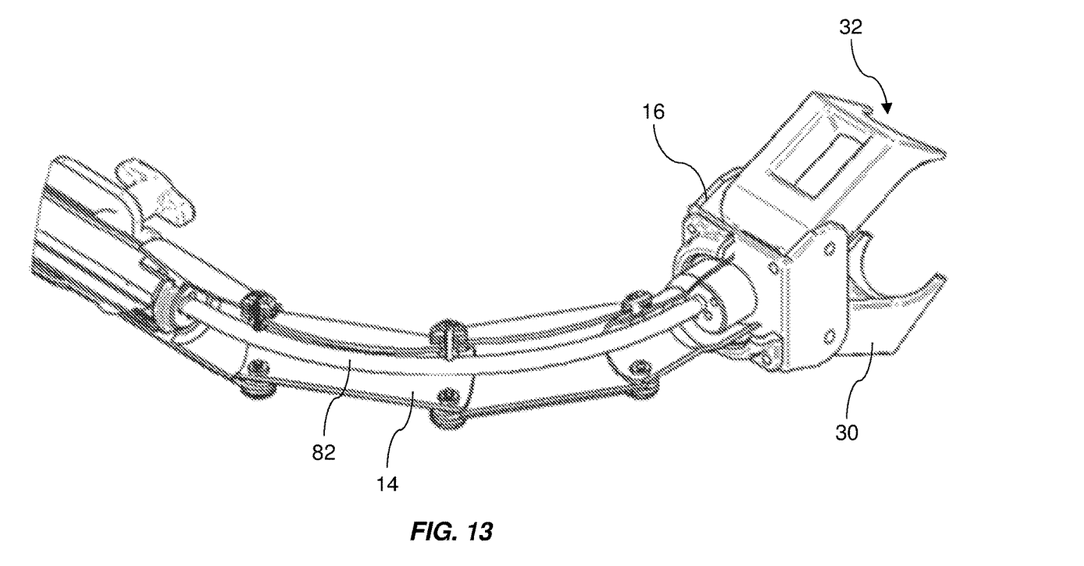
FIG. 13 is a perspective view of the door opening device of FIG. 11 with part of the elbow made transparent so that a cable is visible.

In the embodiment shown in FIG. 13, rotating the handle 12 results in a corresponding rotation of the head 16. For example, the handle 12 and the head 16 may be mechanically coupled by a cable 82, such that a rotation of the handle 12 results in a corresponding rotation of the head 16. In the embodiment shown in FIG. 7, the elbow 50 includes a cable 82 that conveys torque from the handle 12 to the head 16. The cable 82 may be located within an interior of the telescoping pole 14 and elbow 50, and the cable 82 may bend with the elbow 50.

Figure 14:
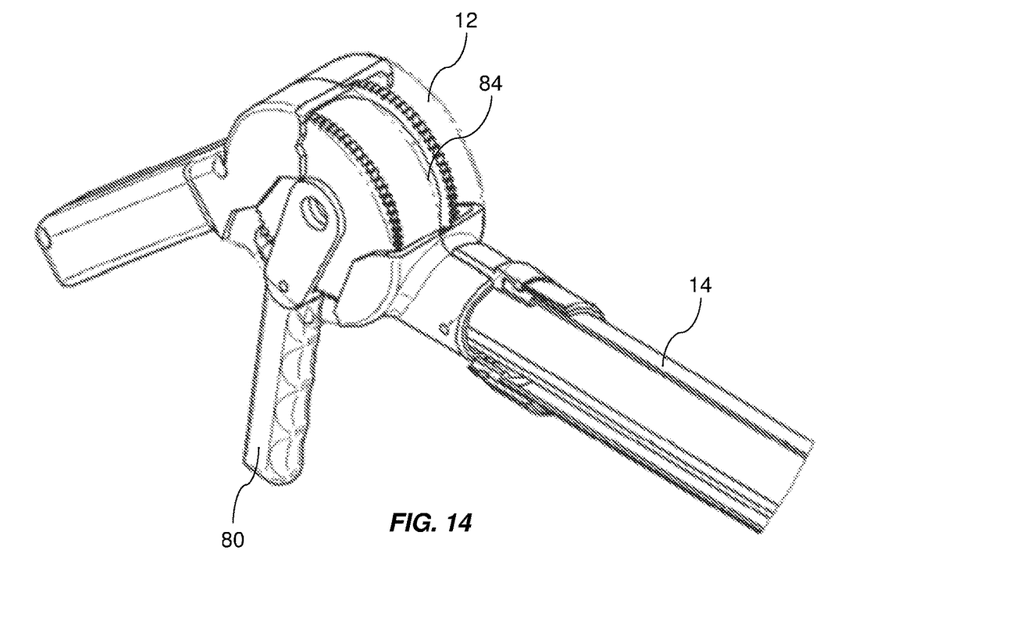
FIG. 14 is a perspective view of the door opening device of FIG. 11 showing a housing of the handle transparent so that a cable reel is visible.

Also, closing of the lever 80 may result in a tensioning of the cable 82 that causes a closing of the grabber 30. For example, the handle 12 may include a reel 84 configured to maintain tension in the cable 82. That is, the cable reel 84 may maintain a tension in the cable 82 between the handle 12 and the head 16. By keeping tension on the cable 82, when an operator rotates the handle 12, the head 16 may go through a similar rotation.

Figure 15:
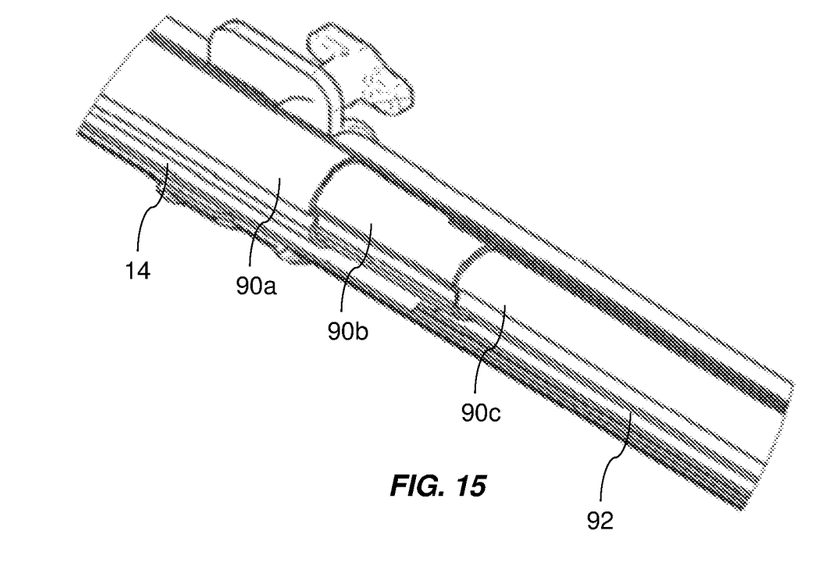
FIG. 15 is a perspective view of an embodiment of the telescoping pole with portions transparent so that multiple sleeves of the telescoping pole are visible.

Turning to FIG. 15, an embodiment of the telescoping pole 14 is shown. In the depicted embodiment, the telescoping pole 14 includes an outer sleeve 90a, an intermediary sleeve 90b, and an inner sleeve 90c. The sleeves 90 are prevented from rotating relative to one another using channels 92 in the sleeves 90. That is, the channels 92 of an outer sleeve 90a interact with channels 92 of an adjacent inner sleeve 90b so that an orientation of the sleeves 90 relative to one another is maintained. Maintaining an orientation of the sleeves 90 relative to one another is used to enable the head to rotate without the telescoping tube 14 rotating.

While the device is described above with respect to opening a door, the device may also be used to deliver objects. For example, the device may be used to deliver a smoke/can canisters.

The telescoping pole 14, handle 12, and head 16 may be made from any suitable material, such as aluminum and/or carbon fiber.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A door opening device comprising:
    a handle including a user interface having a grabber element and a rotation element;
    a telescoping pole, wherein the handle is mechanically coupled to a first end of the telescoping pole;
    a head including a grabber configured to transition between an open state and a closed state, wherein the head is mechanically coupled to a second end of the telescoping pole opposite the first end;
    a grabber actuator configured to cause the transition of the grabber between the open state and the closed state;
    a rotation actuator configured to rotate the grabber;
    a battery operatively coupled to the user interface, the grabber actuator, and the rotation actuator, wherein the battery is configured to store electrical power and to supply the stored electrical power to the grabber actuator and the rotation actuator, wherein:
        activation of the grabber element results in transitioning of the grabber between the open state and the closed state;
        activation of the rotation element results in rotation of the grabber;
        the telescoping pole includes an elbow at the second end and the grabber is mechanically coupled to the elbow; and
        the elbow is adjustable to reposition the grabber off of a central axis of the telescoping pole;
    an elbow actuator configured to modulate a position of the grabber off of the central axis, wherein the user interface additionally includes an elbow element and activation of the elbow controls modulation of the position of the grabber off of the central axis by the elbow actuator.

2. The device of claim 1, wherein the head includes at least one of the grabber actuator or the rotation actuator.

3. The device of claim 2, wherein the head and the handle are electrically coupled, and the grabber actuator and the rotation actuator are electrical actuators.

4. The device of claim 1, wherein:
    the telescoping pole includes multiple sleeves having intersecting features; and
    the intersecting features of adjacent sleeves are configured to interact such that an orientation of the adjacent sleeves is maintained.

5. The device of claim 1, wherein the battery is located in the handle and the battery is electrically connected to the grabber actuator and the rotation actuator via an electrical cord traveling between the handle and the head in an interior of the telescoping pole.

6. The device of claim 1, wherein the grabber element is a button and the rotation element is another button separate from the button of the grabber element.

7. The device of claim 1, wherein the head includes a mount for physically attaching accessories to the head.

8. The device of claim 7, wherein the mount is a picatinny rail.

9. The device of claim 1, wherein:
    the head and the handle are electrically coupled and the grabber actuator comprises an electrical actuator; or
    the head and the handle are pneumatically coupled and the grabber actuator comprises a pneumatic actuator.

10. A door opening device comprising:
    a handle including a lever;
    a telescoping pole, wherein the handle is mechanically coupled to a first end of the telescoping pole; and
    a head including a grabber configured to transition between an open state and a closed state, wherein:
        the head is mechanically coupled to a second end of the telescoping pole opposite the first end;
        the handle and the head are coupled, such that:
            actuating the lever of the handle results in actuation of the grabber between the open and the closed state; and
            rotating the handle results in a rotation of the grabber;
        the telescoping pole includes an elbow at the second end and the grabber is mechanically coupled to the elbow;
        the elbow is adjustable to reposition the grabber off of a central axis of the pole;
        the handle and the head are mechanically coupled by a cable, such that a rotation of the handle results in a corresponding rotation of the head;
        a closing of the lever results in a tensioning of the cable that causes a closing of the grabber; and
        the handle includes a reel configured to maintain tension in the cable.

11. The device of claim 10, wherein:
    the telescoping pole includes multiple sleeves having intersecting features; and
    the intersecting features of adjacent sleeves are configured to interact such that an orientation of the adjacent sleeves is maintained.

12. The device of claim 10, wherein the head includes a mount for physically attaching accessories to the head.

* * * * *